(12) United States Patent
Mun et al.

(10) Patent No.: US 8,908,548 B2
(45) Date of Patent: Dec. 9, 2014

(54) METHOD AND APPARATUS FOR FEEDBACK OF CHANNEL STATE INFORMATION IN A DISTRIBUTED ANTENNA SYSTEM (DAS)—BASED WIRELESS COMMUNICATION SYSTEM

(75) Inventors: Cheol Mun, Gyeonggi-do (KR); Sung Tae Kim, Gyeonggi-do (KR); Jong Kwan Yook, Seoul (KR); Youn Sun Kim, Gyeonggi-do (KR); Jin Kyu Han, Seoul (KR)

(73) Assignees: Samsung Electronics Co., Ltd. (KR); Industry-Academic Cooperation Foundation, Yonsei University (KR)

( * ) Notice: Subject to any disclaimer, the term of this patent is extended or adjusted under 35 U.S.C. 154(b) by 449 days.

(21) Appl. No.: 13/313,642

(22) Filed: Dec. 7, 2011

(65) Prior Publication Data
US 2012/0140663 A1    Jun. 7, 2012

(30) Foreign Application Priority Data
Dec. 7, 2010   (KR) ........................ 10-2010-0124022

(51) Int. Cl.
*H04J 3/14*       (2006.01)
*H04W 72/08*   (2009.01)
*H04W 24/10*   (2009.01)
*H04W 48/08*   (2009.01)
*H04W 48/20*   (2009.01)

(52) U.S. Cl.
CPC ............ *H04W 72/085* (2013.01); *H04W 24/10* (2013.01); *H04W 48/08* (2013.01); *H04W 48/20* (2013.01)
USPC ......................................................... 370/252

(58) Field of Classification Search
None
See application file for complete search history.

(56) References Cited

U.S. PATENT DOCUMENTS

2011/0199946 A1*   8/2011   Breit et al. .................... 370/310

* cited by examiner

*Primary Examiner* — Andrew Lai
*Assistant Examiner* — Leon Andrews
(74) *Attorney, Agent, or Firm* — The Farrell Law Firm, P.C.

(57) ABSTRACT

Feedback methods and apparatuses are provided for efficiently feeding back downlink Channel State Information (CSI) using limited information in a DAS-based wireless communication system. A method includes determining, by a receiver, a candidate Antenna Port (AP) set from among a plurality of APs; selecting an active AP set from the candidate AP set; and transmitting the candidate AP set, the active AP set, and the downlink CSI of active APs included in the active AP set.

20 Claims, 5 Drawing Sheets

METHOD AND APPARATUS FOR FEEDBACK OF CHANNEL STATE INFORMATION IN A DISTRIBUTED ANTENNA SYSTEM (DAS)—BASED WIRELESS COMMUNICATION SYSTEM

PRIORITY

This application claims priority under 35 U.S.C. §119(a) to Korean Patent Application Serial No. 10-2010-0124022, which was filed in the Korean Intellectual Property Office on Dec. 7, 2010, the entire disclosure of which is hereby incorporated by reference.

BACKGROUND OF THE INVENTION

1. Field of the Invention

The present invention relates generally to a downlink Distributed Antenna System (DAS) and, in particular, to a method and apparatus for feeding back downlink channel information in a DAS-based wireless communication system using DAS channel characteristics.

2. Description of the Related Art

A DAS is formed by a Central Processing Unit (CPU) connected to a plurality of transmit antennas distributed within a cell through wired and/or wireless links. Accordingly, an Access Terminal (AT) can establish a virtual cell with a few adjacent distributed antennas.

With the distribution of the transmit antennas over a wide area, a DAS is capable of obtaining macroscopic diversity gain and is advantageous in that it is possible to provide the AT located at a cell boundary with a high data rate, high quality communication service. Further, reduced transmission power of each antenna decreases inter-cell interference, thereby improving system throughput. Accordingly, a DAS is expected to be a core technology for $4^{th}$ generation wireless communication systems.

When a CPU is connected with M distributed Antenna Ports (APs), each of which uses $n_T$ transmit antennas, downlink data generated by the CPU is simultaneously transmitted through total $Mn_T$ transmit antennas. When multiple reception antennas are used at a receiver, a DAS can efficiently transmit the downlink data with a Multiple-Input and Multiple-Output (MIMO) technique.

In MIMO techniques, a transmitter and a receiver operate with spatial processing based on MIMO Channel State Information (CSI). Particularly in downlink, the transmitter should have the downlink MIMO channel information from $n_T$ transmit antennas of a Base Transceiver Station (BTS, hereinafter used with the term "transmitter" interchangeably) to $n_R$ receive antennas of the AT (hereinafter, used with the term "receiver" interchangeably).

In a Frequency Division Duplex (FDD) system in which the downlink and uplink are allocated separate frequency bands, the receiver estimates the downlink channel state and feeds back the estimated downlink CSI to the transmitter. However, it is inevitable that the number of transmit antennas increases in the DAS, significantly increasing the amount of feedback of CSI.

Therefore, there is a need for a feedback technique for transmitting the CSI using a limited amount of feedback information, without compromising the increase of the number of the transmit antennas in a DAS.

Further, a channel environment of a DAS significantly differs from a conventional co-located MIMO channel environment. Particularly, because propagation paths between an AT and the AP distributed within a cell are highly different from each other, the average Signal-to-Noise Ratios (SNRs) for the different antennas show significant differences too. For example, the channels from transmit antennas of different APs have uncorrelated channel characteristic, while the channels from the transmit antennas of the same AP to an AT are correlated, i.e., the correlated channel environment and uncorrelated channel environment coexist. Accordingly, if the feedback technique of a conventional MIMO scheme is applied to a DAS without modification, performance is poor. Accordingly, a need exists for a new feedback technique suitable for a DAS channel environment.

SUMMARY OF THE INVENTION

The present invention has been made in an effort to solve at least the above-described problems occurring in the related art, and to provide at least the following advantages.

Accordingly, an aspect of the present invention is to provide a new feedback technique for a DAS channel environment, which is transmits downlink CSI with limited feedback information, even with a transmitter configuration using a plurality of transmit antennas.

It is another aspect of the present invention to provide a data transmission/reception apparatuses and methods for transmitting downlink CSI using limited feedback information in a DAS transmitter configuration having a plurality of antennas using DAS channel characteristics.

It is another aspect of the present invention to provide a feedback method and apparatus for transmitting information on an active AP set selected by each AT, using limited feedback information, in a DAS configuration having a plurality of APs.

In accordance with an aspect of the present invention, a CSI feedback method is provided for a receiver of a DAS-wireless communication system. The method includes determining, by the receiver, a candidate AP set from among a plurality of APs; selecting an active AP set from the candidate AP set; and transmitting the candidate AP set, the active AP set, and the downlink CSI of active APs included in the active AP set.

In accordance with another aspect of the present invention, a CSI feedback apparatus is provided for a receiver of a DAS-wireless communication system. The CSI feedback apparatus includes a candidate AP set determination unit that determines a candidate AP set from among a plurality of APs; an active AP set determination unit that selects an active AP set from the candidate AP set; and a transceiver that transmits the candidate AP set, the active AP set, and downlink CSI of active APs included in the active AP set.

In accordance with another aspect of the present invention, a CSI processing method is provided for a transmitter of a DAS-wireless communication system. The method includes receiving information on a candidate AP set including candidate APs selected from among a plurality of APs; receiving information on an active AP set including active APs selected from the candidate AP set; receiving downlink CSI on the active APs; and determining a maximum singular vector of downlink channel matrix for the plurality of APs using the downlink CSI on the active APs.

In accordance with another aspect of the present invention, a CSI processing apparatus is provided for a transmitter of a DAS-wireless communication system. The CSI processing apparatus includes a feedback receiver that receives information on a candidate AP set including candidate APs selected from among a plurality of APs, information on an active AP set including active APs selected from the candidate AP set, and downlink CSI on the active APs; and an AP channel matrix recovery unit that determines a maximum singular vector of downlink channel matrix for the plurality of APs using the downlink CSI on the active APs.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Various embodiments of the present invention will be described in detail below with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

A. Distributed Antenna System (DAS) Model

A DAS includes transmit antennas of a transmitter that are spatially distributed within a service area.

Figure 1:
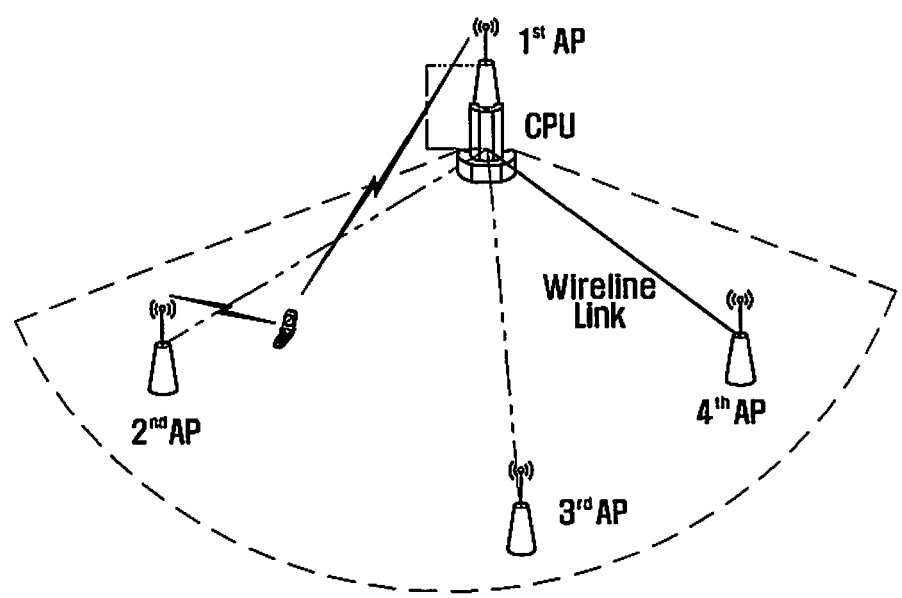
FIG. 1 illustrates a DAS according to an embodiment of the present invention.

FIG. 1 illustrates a DAS according to an embodiment of the present invention.

Referring to FIG. 1, a base station CPU is connected to M APs through a high speed wired backhaul communication network and the M APs are distributed uniformly within a cell, where each AP uses $n_T$ transmit antennas. K ATs distributed within the cell use $n_R$ receive antennas. Although FIG. 4 specifically illustrates a sector including four APs, i.e., M=4, for convenience, the present invention is not limited to a DAS system including a certain number of APs.

When x is an $Mn_T \times 1$ data symbol vector transmitted through $Mn_T$ total transmit antennas of M APs, $y_k$ is an $n_R \times 1$ reception signal vector of a $k^{th}$ AT, and non-frequency selective fading is used, a reception signal can be expressed as shown in Equation (1).

$$y_k = [\sqrt{\gamma_{k,1}}\, H_{k,1} \quad \sqrt{\gamma_{k,2}}\, H_{k,2} \quad \sqrt{\gamma_{k,3}}\, H_{k,3} \quad \sqrt{\gamma_{k,4}}\, H_{k,4}\,]x + n_k \quad (1)$$
$$= \tilde{H}_k x + n_k$$

In Equation (1), $H_{k,m}$ denotes an $n_R \times n_T$ complex channel matrix from an $m^{th}$ AP to the $k^{th}$ AT and includes independently and identically distributed (i.i.d.) complex numbers having zero mean and unit variance. $\tilde{H}_k$ denotes an $n_R \times Mn_T$ DAS downlink channel matrix from the M APs to the $k^{th}$ AT, and $n_k$ denotes an $n_R \times 1$ Additive White Gaussian Noise (AWGN) vector. $\gamma_{k,m}$ denotes average SNR of a signal from the $m^{th}$ AP to the $k^{th}$ AT. Because the propagation paths between an AT and individual APs are different, there are significant differences in path loss and slow fading including shadow fading. Consequently, differences between the average SNRs of different APs that are measured at one AT is large, e.g., about a few multiple of 10.

In FIG. 1, because the SNRs of the signals received from the $1^{st}$ and $2^{nd}$ APs are much greater than the SNRs of the signals received form the $3^{rd}$ and fourth APs, the channel matrix received from the $3^{rd}$ and $4^{th}$ APs can be expressed as follows by approximating to the $n_R \times n_T$ zero matrix.

$$y_k \approx [\sqrt{\gamma_{k,1}}\, H_{k,1}\, \sqrt{\gamma_{k,2}}\, H_{k,2}\, 0\, 0]x + n_k \quad (2)$$

Because the signal received from the $3^{rd}$ and $4^{th}$ APs has a lower signal strength than the signal received from the $1^{st}$ and $2^{nd}$ APs, the signal received from the $3^{rd}$ and $4^{th}$ APs can be ignored as a zero matrix with little influence to the DAS downlink data transmission.

The downlink data generated by the CPU is transmitted through $Mn_T$ total transmit antennas and received through $n_R$ receive antennas at the receiver, such that the downlink data can be efficiently transmitted with a MIMO technique. The AT estimates downlink channels and feeds back the estimated downlink CSI through an uplink channel having limited capacity.

B. Proposed Active Antenna Port (AP) Selection and Hybrid Feedback

In order to efficiently transmit downlink data in a DAS system, an AT estimates a DAS downlink channel matrix $\tilde{H}_k$ and feeds back the estimated channel matrix to the transmitter using a limited amount of feedback information. Typically, the DAS downlink channel matrix $\tilde{H}_k$ is a sparse matrix including sub-matrices, i.e., zero matrices, as shown in Equation (2). Accordingly, it is more efficient to feed back the downlink matrices of the AP (less than M) that are actually influencing the downlink data transmission performance rather than to feed back $\tilde{H}_k$ estimated by the AT (including all AP's downlink channel matrices). Accordingly, each AT estimates the downlink channels of all of the M APs and selects a set of $M_A$ APs to be fed back to the transmitter. Here, $M_a \leq M$.

Slow fading and fast fading between an AT and each AP are factors influencing an optimal active AP set selection at each AT. The slow fading including path loss and shadow fading is used to determine the average received signal level of the signal received by the AT. The fast fading changes the received signal level of the AT up to 30~40 dB from the average received signal level caused by the path loss. Accordingly, the optimal active AP set selection of each AT is done in consideration of the fast fading and the slow fading and, for this purpose, in accordance with an embodiment of the present invention, each AT selects an active AP set at every frame and feeds back to the transmitter. When there is a total of M APs distributed within a cell, the amount of feedback information for feedback of the active AP set selected at each transmission frame is M bits.

As the number of AP distributed in the cell increases, i.e., as M increases, the amount instant feedback information for feedback of the selected active AP set increases significantly. In order to solve this problem, an embodiment of the present invention proposes a hybrid active AP selection method in which a candidate AP set including $M_C (\leq M)$ APs is selected in consideration of the slow fading among all of the APs and an active AP set is then selected in consideration of the fast fading from the candidate AP set. Because the slow fading is channel information that does not vary for relatively long time, the information on the candidate AP set can be transmitted through a long-term feedback channel across a plurality of uplink frames and is updated at a long interval, such that the feedback information amount required per uplink transmission frame is insignificant. Accordingly, the proposed hybrid feedback method restricts the amount of instant feedback information for efficiently transmitting the selected active AP set over $M_C$ bits, even when the total number of APs is large.

Figure 2:
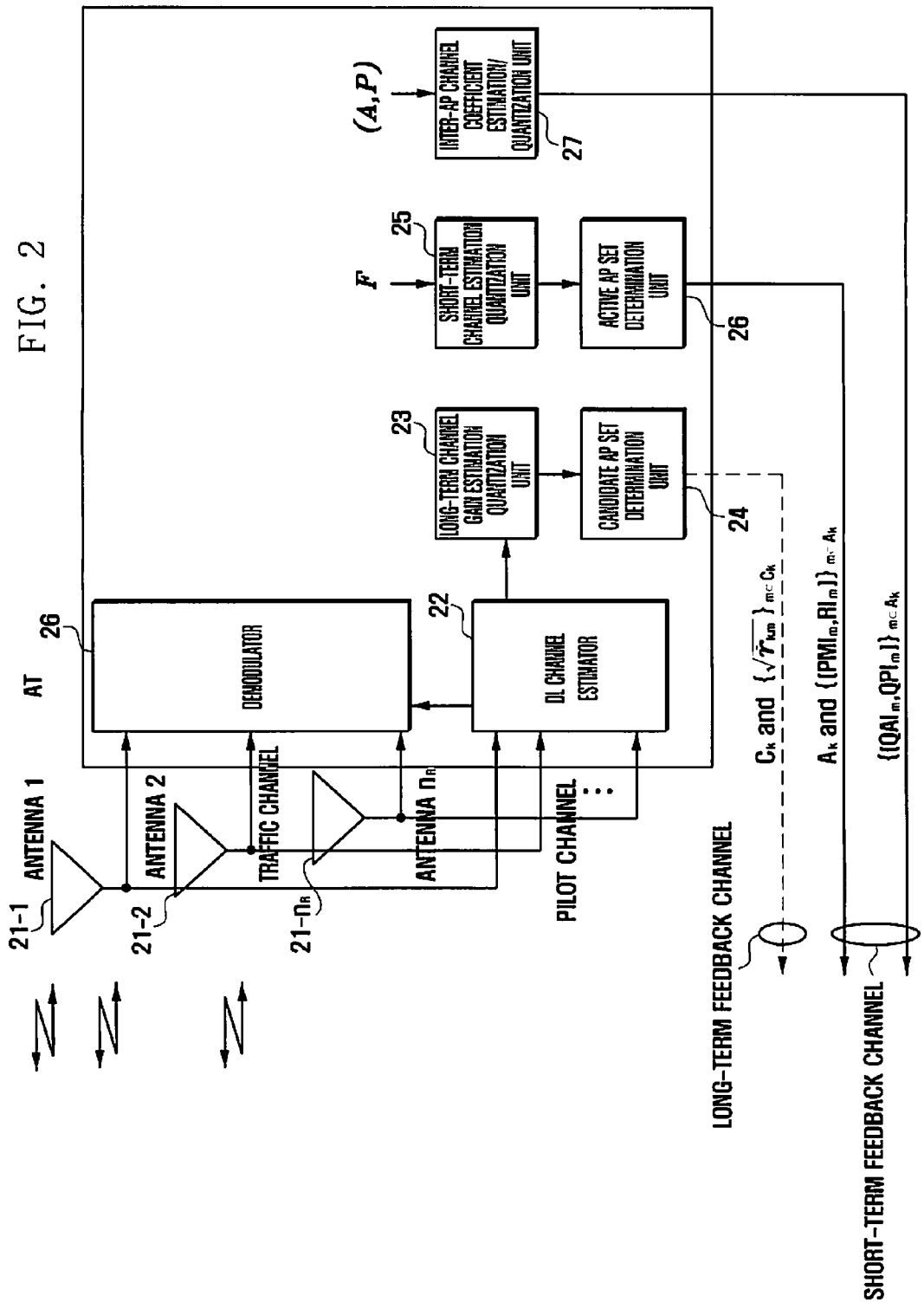
FIG. 2 is a block diagram illustrating an AT supporting DAS feedback according to an embodiment of the present invention.

FIG. 2 is a block diagram illustrating an AT for supporting a DAS feedback method according to an embodiment of the present invention.

Referring to FIG. 2, the AT includes antennas 21-1 to 21-$n_R$, a demodulator 20, a Down Link (DL) channel estimator 22, a long-term channel gain estimation quantization unit 23, a candidate AP set determination unit 24, a short-term channel gain estimation quantization unit 25, an active AP set determination unit 26, and an inter-AP channel coefficient estimation/quantization unit 27.

Figure 3:
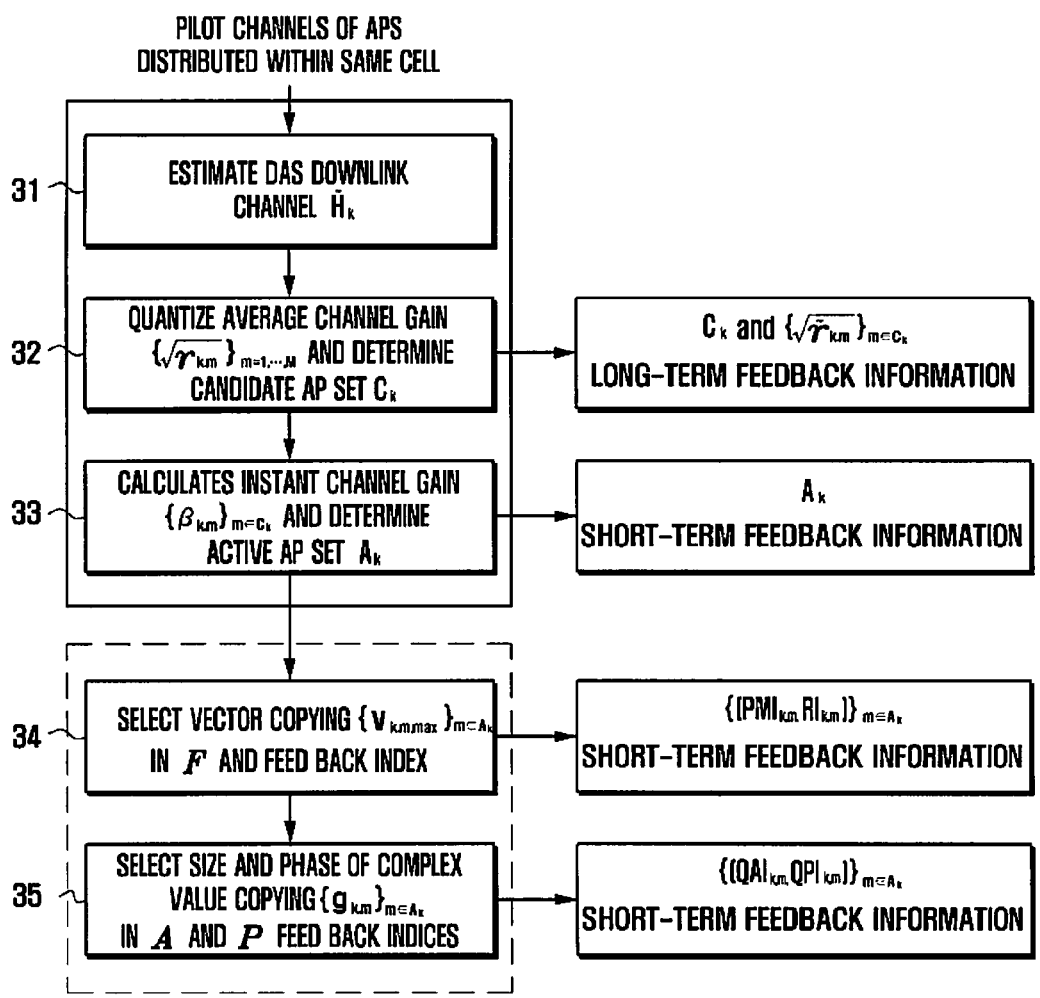
FIG. 3 is a flowchart illustrating a DAS downlink channel information feedback method according to an embodiment of the present invention.

FIG. 3 is a flowchart illustrating a DAS downlink channel information feedback method according to an embodiment of the present invention. FIG. 3 will be described below with reference to the AT illustrated in FIG. 2.

Referring to FIG. 3, steps 31 to 33 illustrate operations executed at the AT for the proposed hybrid active AP selection method.

First, the demodulator 20 demodulates a signal received from each antenna.

Thereafter, in step 31, the downlink channel estimator 22 estimates the downlink channel matrix $\tilde{H}_k = [\sqrt{\gamma_{k,1}} H_{k,1} \cdots \sqrt{\gamma_{k,M}} H_{k,M}]$ of a DAS using pilot channels transmitted from M APs.

In step 32, the long-term channel gain estimation quantization unit 23 calculates an average channel gain $\{\sqrt{\tilde{\gamma}_{k,m}}\}_{m=1,\ldots,M}$ in consideration of the slow fading by averaging the channel matrix $\{\sqrt{\gamma_{k,m}} H_{k,m}\}_{m=1,\ldots,M}$ received from the APs and quantizes the average channel gain, and the candidate AP set determination unit 24 determines the candidate AP set $C_k$ and then feeds back the candidate AP set $C_k$ and quantized candidate APs' average channel gain value $\{\sqrt{\tilde{\gamma}_{k,m}}\}_{m \in C_k}$. Whether the corresponding AP belongs to the candidate AP set $C_k$ is determined based on the calculated M average channel gains as shown in Equation (3).

$$\begin{cases} \dfrac{\sqrt{\gamma_{k,m}}}{\sqrt{\gamma_{k,max}}} \geq \gamma_{th}, & m \in C_k \\ \dfrac{\sqrt{\gamma_{k,m}}}{\sqrt{\gamma_{k,max}}} < \gamma_{th}, & m \notin C_k \end{cases} \quad (3)$$

In Equation (3), $\sqrt{\gamma_{k,max}}$ denotes a maximum value among the M AP's average channel gains $\{\sqrt{\gamma_{k,m}}\}_{m=1,\ldots,M}$, and $\sqrt{\gamma_{k,max}} = \max\{\sqrt{\gamma_{k,1}}, \sqrt{\gamma_{k,2}}, \ldots \sqrt{\gamma_{k,M}}\}$. Accordingly, if the average channel gain $\sqrt{\gamma_{k,m}}$ from the $m^{th}$ AP is less than $\gamma_{th}$ multiple of $\sqrt{\gamma_{k,max}}$, the $m^{th}$ AP does not belong to the candidate AP set $C_k$, and thus, the channel information on the corresponding AP is not fed back to the transmitter. The candidate AP set $C_k$ can be updated periodically at a predetermined interval or non-periodically when the average channel gain $\{\sqrt{\gamma_{k,m}}\}_{m=1,\ldots,M}$ estimated in step 32 varies significantly.

$\gamma_{th}$ can be set to a fixed value shared by the transmitter and the AT. In this case, the number of APs included in the candidate AP set $C_k$ varies depending on the channel environment of each AT, and thus, the amount of instant information for feedback of the active AP varies depending on the AT.

In contrast, the number of APs included in the candidate AP set $C_k$ is set to a fixed value agreed between the transmitter and AT, while ATs have $\gamma_{th}$ set to different values. In this case, the same amount of instant information for feedback of the active AT set is used at all of the ATs.

The candidate AP set determination in step 32 can be performed identically at the transmitter using the quantized channel gain value $\{\sqrt{\tilde{\gamma}_{k,m}}\}_{m=1,\ldots,M}$ through the determination process with Equation (3). The transmitter and ATs can share $\gamma_{th}$ set to a fixed value or the number of APs belonged to the candidate AP set $C_k$ that is set to a fixed value.

In step 33, the short-term channel estimation quantization unit 25 calculates $\beta_{k,m} = \sqrt{\gamma_{k,m}} \lambda_{k,m}$ by multiplying the average channel gain value $\{\sqrt{\tilde{\gamma}_{k,m}}\}_{m \in C_k}$ calculated in step 32 for the APs included in the candidate AP set $C_k$ and the instant channel gain $\{\lambda_{k,m}\}_{m \in C_k}$. The instant channel gain $\{\lambda_{k,m}\}_{m \in C_k}$ received from the APs included in the candidate AP set $C_k$ is obtained as a maximum singular value of the downlink channel matrix $\{H_{k,m}\}_{m \in C_k}$ from the individual APs to the AT. The active AP set determination unit 26 determines the active AP set $A_k$ using the calculated $\{\beta_{k,m}\}_{m \in C_k}$ and feeds back the active AP set $A_k$ to the transmitter. The active AP set determination unit 26 determines whether the AP is included in the candidate AP set $C_k$ of the active AP set $A_k$ using $\{\beta_{k,m}\}_{m \in C_k}$ according to Equation (4).

$$\begin{cases} \dfrac{\beta_{k,m}}{\beta_{k,max}} \geq \beta_{th}, & m \in A_k \\ \dfrac{\beta_{k,m}}{\beta_{k,max}} < \beta_{th}, & m \notin A_k \end{cases} \quad (4)$$

In Equation (4), $\beta_{k,max} = \max\{\{\beta_{k,m}\}_{m \in C_k}\}$. Accordingly, among the APs included in the candidate AP set $C_k$, an AP for which $\beta_{k,m}/\beta_{k,max}$ is equal to or greater than a predetermined value $\beta_{th}$ in consideration of instant channel gain is included in the final active AP set. The active AP set $A_k$ is updated for each transmission frame, and the information on the active AP set $A_k$ is transmitted to the transmitter with $M_C$ bits of instant feedback information.

C. Downlink CSI Feedback for a DAS

In order to perform high speed downlink data transmission in a DAS, the AT estimates a DAS downlink channel matrix $\tilde{H}_k$ and transmits the estimated DAS downlink channel matrix $\tilde{H}_k$ to the transmitter using a limited amount of feedback information. Accordingly, the DAS downlink channel matrix $\tilde{H}_k$ can be expressed with channel matrices from APs included in the active AP set $A_k$, as shown in Equation (5).

$$\tilde{H}_k = [\sqrt{\gamma_{k,1}} H_{k,1} \quad \sqrt{\gamma_{k,2}} H_{k,2} \quad \sqrt{\gamma_{k,3}} H_{k,3} \quad \sqrt{\gamma_{k,4}} H_{k,4}] \quad (5)$$

$$\xrightarrow{\text{Active AP selection}} [\sqrt{\gamma_{k,1}} H_{k,1} \quad \sqrt{\gamma_{k,2}} H_{k,2} \quad 0 \quad 0]$$

In this description, $A_k = \{1, 2\}$ is assumed for ease of description.

When using a MIMO technique in a DAS, an accurate maximum singular vector of the downlink channel matrix $\tilde{H}_k$ is fed back. In the DAS channel environment, the channels from the transmit antennas of the same AP to an AT are correlated with each other, while the channels from transmit antennas of different APs to the AT have uncorrelated channel characteristics, i.e., the correlated channel environment and uncorrelated channel environment coexist.

Particularly, if a rank of the downlink channel from each AP to a $k^{th}$ AT is 1, i.e., the spatial correlation is higher, the maximum singular vector $\tilde{v}_{k,max}$ of $\tilde{H}_k$ can be approximated as shown in Equation (6).

$$\tilde{v}_{k,max} \approx \begin{bmatrix} \sqrt{\gamma_{k,1}}\, g_{k,1} v_{k,1,max} \\ \sqrt{\gamma_{k,2}}\, g_{k,2} v_{k,2,max} \\ 0 \\ 0 \end{bmatrix} \qquad (6)$$

In Equation (6), $v_{k,m,max}$, which has an $n_T \times 1$ size, denotes the maximum singular vector of the downlink channel from an $n^{th}$ AP to a $k^{th}$ AT $H_{k,m}$, and $\{g_{k,m}\}_{m \in A_k}$ denotes i.i.d. a complex Gaussian random variable $\sqrt{g_{k,1}^2 + g_{k,2}^2} = 1$.

In Equation (6), the maximum singular vector $\tilde{v}_{k,max}$ of the DAS downlink channel has a form in which the multiplication of $M_A$ $\{v_{k,m,max}\}_{m \in A_k}$ obtained by multiplying Gaussian random variables and average channel gains, and $M-M_A$ $n_T \times 1$ zero vectors are accumulated vertically. That is, $\tilde{v}_{k,max}$, which has the size $Mn_T \times 1$, can be expressed by separate $M_A$ $\{v_{k,m,max}\}_{m \in A_k}$ having a size of $n_T \times 1$ Gaussian random variables $\{g_{k,m}\}_{m \in A_k}$ multiplied thereto respectively, and an average channel gain $\{\sqrt{\gamma_{k,m}}\}_{m \in A_k}$. The maximum singular vector $\tilde{v}_{k,max}$ can be expressed as shown in Equation (7).

$$\tilde{v}_{k,max} = \begin{bmatrix} \sqrt{\gamma_{k,1}}\, g_{k,1} v_{k,1,max} \\ \sqrt{\gamma_{k,2}}\, g_{k,2} v_{k,2,max} \\ 0 \\ 0 \end{bmatrix} = \left( \begin{bmatrix} \sqrt{\gamma_{k,1}} \\ \sqrt{\gamma_{k,2}} \\ 0 \\ 0 \end{bmatrix} \circ \begin{bmatrix} g_{k,1} \\ g_{k,2} \\ 0 \\ 0 \end{bmatrix} \right) \odot \begin{bmatrix} v_{k,1,max} \\ v_{k,2,max} \\ 0 \\ 0 \end{bmatrix} \qquad (7)$$

In Equation (7), the $\circ$ vector operation denotes multiplication of the elements at the same position, and the $\odot$ vector operation is defined as shown in Equation (8).

$$a \odot \begin{bmatrix} b \\ c \\ d \end{bmatrix} = \begin{bmatrix} a_1 \\ a_2 \\ a_3 \end{bmatrix} \odot \begin{bmatrix} b \\ c \\ d \end{bmatrix} = \begin{bmatrix} a_1 b \\ a_2 c \\ a_3 d \end{bmatrix} \qquad (8)$$

As shown in Equation (7), the information on the maximum singular vector of the downlink channel matrix $\tilde{H}_k$ can be expressed with separate average channel gain information of individual APs included in the active AP set $\{\sqrt{\gamma_{k,m}}\}_{m \in A_k \subset C_k}$, relative channel difference information among active APs $\{g_{k,m}\}_{m \in A_k}$, and a maximum singular vector of individual active AP downlink channels $\{v_{k,m,max}\}_{m \in A_k}$.

Accordingly, the AT transmits this information separately from each other, and the DAS transmitter combines this information to acquire the downlink channel information. The average channel gain information of the APs included in the active AP set $\{\sqrt{\gamma_{k,m}}\}_{m \in A_k \subset C_k}$ is transmitted to the transmitter according to the above-described active AP selection and feedback technique.

Additionally, the AT feeds back the index indicating the weight vector copying the maximum singular vector of the downlink channel matrix $\{H_{k,m}\}_{m \in A_k}$ of individual active APs in a vector codebook F and the quantized complex variables $\{g_{k,m}\}_{m \in A_k}$ to be multiplied to the selected vectors, whereby it is possible to transmit the maximum singular vector $\tilde{v}_{k,max}$ of the DAS downlink channel matrix using a limited amount of feedback information.

The vector codebook F is designed to accurately copy the singular vectors of the correlated individual AP downlink channels and includes a plurality of $n_T \times 1$ vectors. Accordingly, the MIMO precoding codebook adopted in the current 3rd Generation Partnership Project (3GPP) Long Term Evolution (LTE) can be used.

When using the 3GPP LTE MIMO precoding codebook and feedback channel, each AT calculates the maximum singular vector $\{v_{k,m,max}\}_{m \in A_k}$ for each AP through pilot channel estimation on each active AP, selects the vector most-accurately copying $\{v_{k,m,max}\}_{m \in A_k}$ from F, and feeds back the information to the corresponding AP using the Precoding Matrix Indicator ($PMI_m$) and Rank Indicator ($RI_m$) for the $m^{th}$ AP. The vector indicated by $PMI_m$ and $RI_m$ for $m^{th}$ AP in F can be expressed as $\tilde{v}_{k,m,max}(PMI_m, RI_m)$.

The vectors $g_k = [g_{k,1} \; g_{k,M_A}]^T$ including the $M_A$ complex Gaussian random variables $\{g_{k,m}\}_{m \in A_k}$ to be multiplied to the selected $M_A$ weight vectors $\{\tilde{v}_{k,m,max}(PMI_m, RI_m)\}_{m \in A_k}$ should be designed to accurately copy the downlink channel singular vectors between the uncorrelated active APs, and $\|g_k\|=1$. The feedback of the $\{g_{k,m}\}_{m \in A_k}$, as quantized, can be performed using a vector codebook copying $g_k$ or by quantizing the size and phase of $\{g_{k,m}\}_{m \in A_k}$.

When using a vector codebook, a vector codebook G is agreed between the transmitter and the receiver, and the receiver feeds back the index indicating the vector most accurately copying $g_k$ in G to the transmitter. Here, the vectors of size $M_A \times 1$ that are included G should be designed to have isotropic distribution in $M_A$-dimensional complex vector space and, for this purpose, the codebook designed for conventional Random Vector Quantization (RVQ) or the Grassmannian codebook adopted to IEEE 802.16e may be used.

When using the direct quantization of size and phase, the receiver selects the values closest to the size and phase of $M_A$ complex variables $\{g_{k,m}\}_{m \in A_k}$ from the size codebook A including quantized size values and the phase codebook P including quantized phase values, and then feeds back the selected values to the corresponding AP using the Quantized Amplitude indicator ($QAI_m$) and Quantized Phase indicator ($QPI_m$) for the $m^{th}$ AP. Accordingly, the size and phase values of respective A and P are obtained to be appropriate for the size distribution and phase distribution of i.i.d. complex Gaussian random variables.

C.1 Configuration and Operation of Receiver of System Using the Proposed Feedback Technique Referring again to FIG. 3, steps 31 to 33 of FIG. 3, as described above, are performed by the AT for the proposed hybrid active AP selection technique. Through these steps, the AT selects the best active APs and feeds back downlink channel information on the APs included in the active AP set.

Further, in step 34, the short-term channel estimation quantization unit 25 of FIG. 2 calculates the maximum singular vector $\tilde{v}_{k,max}$ of the estimated DAS downlink channel matrix $\tilde{H}_k$. The short-term estimation quantization unit 25 estimates the downlink channels $\{H_{k,m}\}_{m \in A_k}$ from the $M_A$ APs included in the active AP set $A_k$ determined through steps 31 to 33 to the $k^{th}$ AT and calculates the maximum singular vectors $\{v_{k,m,max}\}_{m \in A_k}$ of the individual matrices. The short-term estimation quantization unit 25 selects the vector accurately copying the calculated $v_{k,m,max}$ from a predetermined vector codebook F and feeds back selected vectors using the Precoding Matrix Indicator ($PMI_m$) and Rank Indicator ($RI_m$) to the $m^{th}$ AP. This process is performed for the $M_A$ APs included in the active AP set $A_k$.

In step 35, the inter-AP channel coefficient estimation/quantization unit 27 quantizes the quantized average channel gain $\{\sqrt{\tilde{\gamma}_{k,m}}\}_{m \in A_k}$ obtained in step 32, $M_A$ vectors indicated by $\{(PMI_m, RI_m)\}_{m \in A_k}$ selected from F in step 34, and $M_A$ complex variables $\{g_{k,m}\}_{m \in A_k}$ copying $\tilde{v}_{k,max}$ by being optimally combined as shown in Equation (7). The inter-AP channel coefficient estimation/quantization unit 27 selects the size and phase values of the most appropriate complex value among all complex values that can be expressed in the form of the combination of elements of the size codebook A and phase codebook P, and feeds back the selected values in the form of a $QAI_m$ as an index of A and a $QPI_m$ as an index of P.

Figure 4:
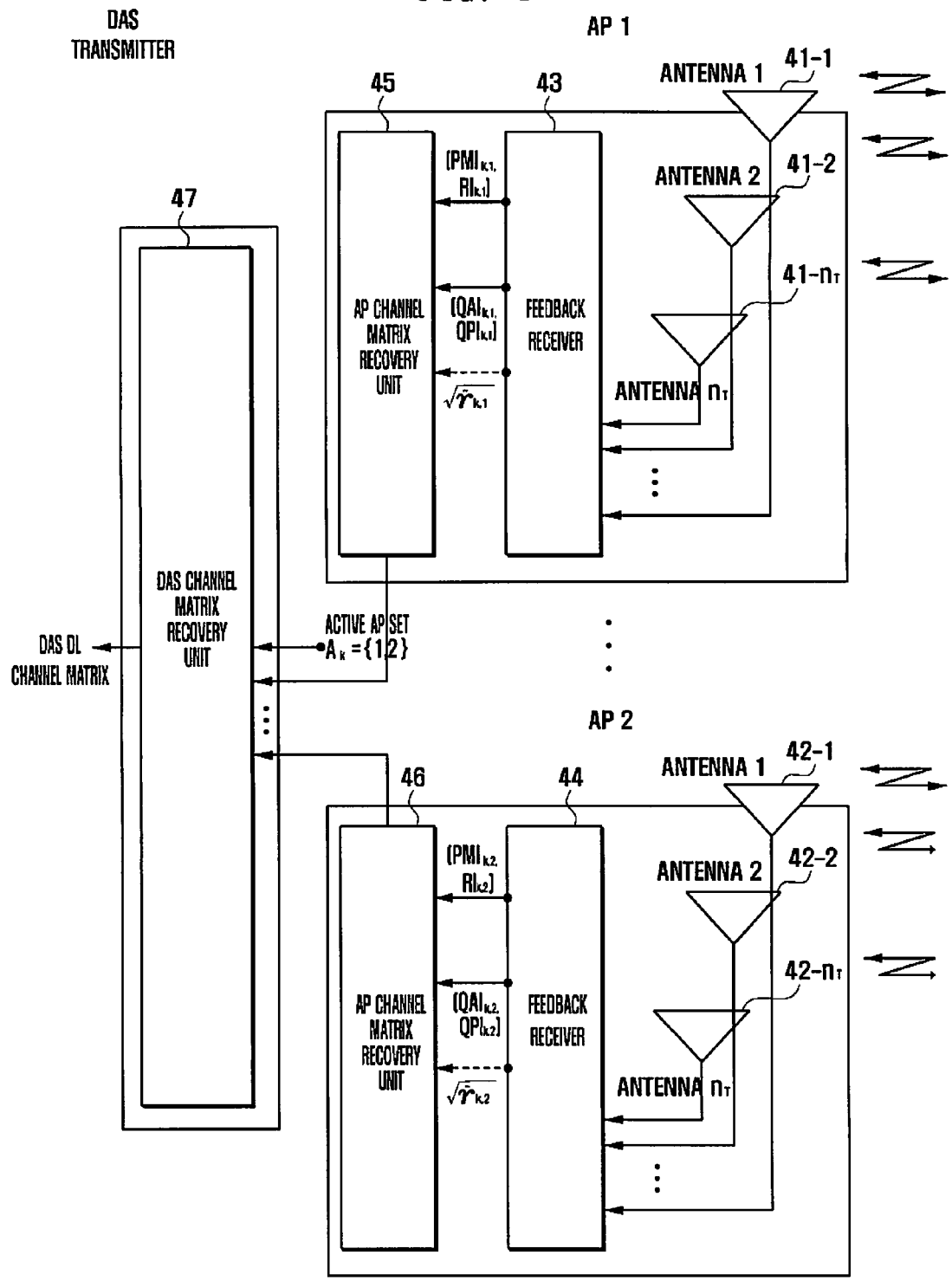
FIG. 4 is a block diagram illustrating a transmitter of a DAS system according to an embodiment of the present invention.
Figure 5:
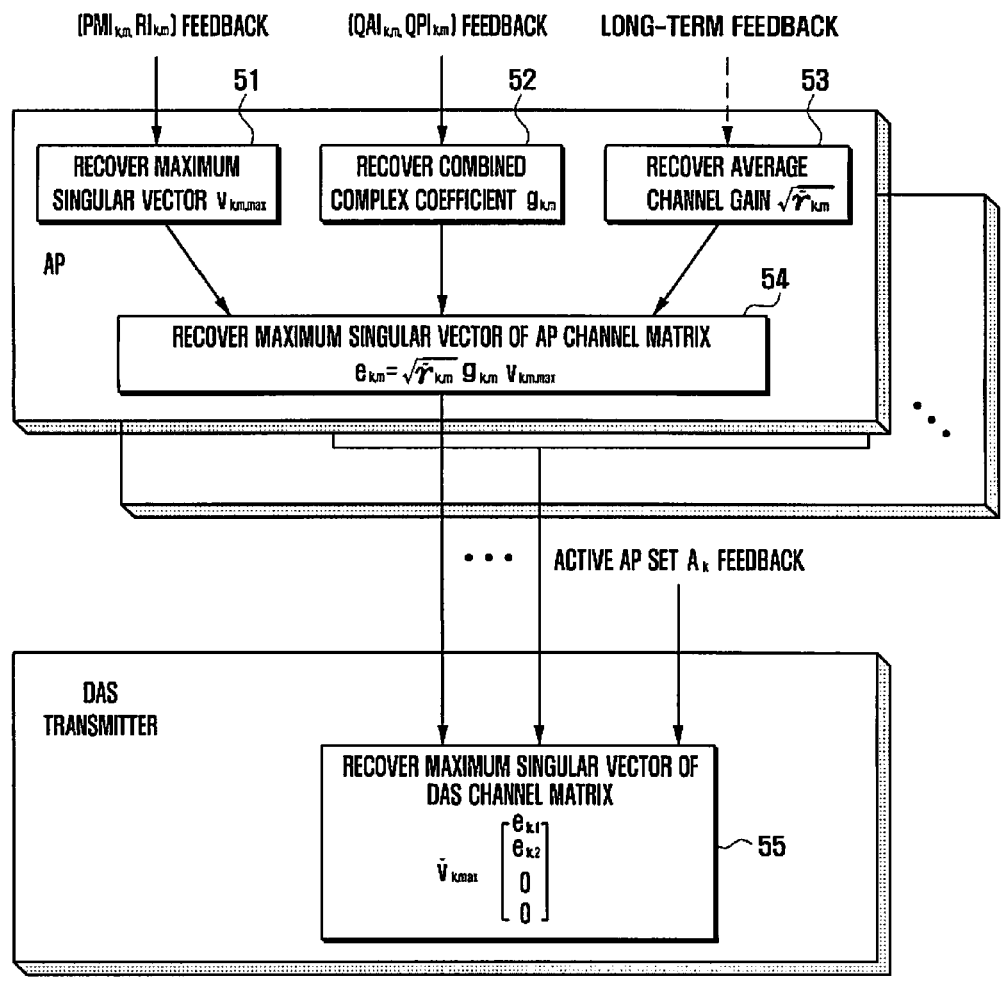
FIG. 5 illustrates operations of a transmitter using a feedback method according to an embodiment of the present invention.

C.2 Configuration and Operation of a Transmitter Using the Proposed Feedback Technique FIG. 4 is a block diagram illustrating a transmitter of a DAS system according to an embodiment of the present invention. FIG. 5 illustrates operations of a transmitter using a feedback method according to an embodiment of the present invention. Specifically, each of the feedback receivers 43 and 44 of the individual active APs in FIG. 4 performs steps 51 to 53 of FIG. 5.

Referring to FIG. 5, in step 51, the feedback receiver decodes ($PMI_{k,m}, RI_{k,m}$) received per AP and recovers the maximum singular vector $v_{k,m,max}$ of the corresponding AP by referencing the vector indicated by the index in the vector codebook F. In step 52, the feedback receiver decodes ($QAI_{k,m}, QPI_{k,m}$) received per AP and recovers the combined complex coefficient $g_{k,m}$ reflecting channel differences between APs by referencing the size and phase values indicated by the indices in the codebooks A and P.

In step 53, the feedback receiver decodes the long-term feedback information received per AP and recovers the average channel gain $\sqrt{\tilde{\gamma}_{k,m}}$ per AP.

Each of the channel matrix recovery units 45 and 46 the APs performs step 54, wherein each of the channel matrix recovery units 45 and 46 combines $v_{k,m,max}$ recovered in step 51, $g_{k,m}$ recovered in step 52, and $\sqrt{\tilde{\gamma}_{k,m}}$ recovered in step 53 into the maximum singular vector of each AP's downlink channel matrix as shown in Equation (9).

$$e_{k,m} = \sqrt{\tilde{\gamma}_{k,m}} g_{k,m} v_{k,m,max} \quad (9)$$

In step 55 of FIG. 5, the DAS channel matrix recovery unit 47 recovers the maximum singular vector of the DAS downlink channel matrix as shown in Equation (10), using maximum singular vectors $\{e_{k,m}\}_{m \in A_k}$ of individual AP downlink channel matrices, which are recovered per AP in step 54, and transmitted to the DAS transmitter through a high speed wired communication network and the active AP set $A_k$ fed back from the AT.

$$\tilde{v}_{k,max} = \begin{bmatrix} e_{k,1} \\ e_{k,2} \\ 0 \\ 0 \end{bmatrix} \quad (10)$$

In Equation (10), the DAS transmitter substitutes the maximum singular vector of the AP that does not belong to the active AP set $A_k$ for a zero vector.

As described above, the feedback methods and apparatuses of the present invention feed back downlink CSI using a limited amount of information in the DAS transmitter configuration using a plurality of transmit antennas.

Further, the feedback methods and apparatuses of the present invention maintain an amount of feedback information without degradation of DAS data transmission performance, even when a plurality of APs are used, by feeding back the CSI through the APs having good channel states influencing the DAS downlink data transmission.

Furthermore, the hybrid feedback method and apparatus of the present invention determines a candidate AP set including $M_C$ APs among a total of M APs in consideration of the path loss and selects an active AP set in consideration of fast fading from the candidate AP set. Accordingly, the proposed hybrid feedback method restricts the amount of instant feedback information for efficiently transmitting the selected active AP set to $M_C$ bits, even when the total number of APs is large.

As described above, a layered feedback technique as proposed in the above-described embodiments of the present invention transmits DAS downlink channel information for a plurality of APs as separated into the individual APs' CSI and relative channel difference information among the APs so as to perform feedback using a limited amount of instant feedback information, while maintaining compatibility with a legacy LTE MIMO feedback technique.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A Channel State Information (CSI) feedback method of a receiver in a wireless communication system including a distributed antenna system, the method comprising:
    determining, by the receiver, a candidate Antenna Port (AP) set from among a plurality of APs;
    selecting an active AP set from the candidate AP set; and
    transmitting information on the candidate AP set, information on the active AP set, and downlink CSI of active APs included in the active AP set.

2. The CSI feedback method of claim 1, wherein the candidate AP set is determined using slow fading.

3. The CSI feedback method of claim 1, wherein the active AP set is selected from the candidate AP set using fast fading.

4. The CSI feedback method of claim 1, wherein determining the candidate AP set comprises:
    estimating downlink channel matrices using pilot channels transmitted by the plurality of APs;
    calculating average channel gains using slow fading by averaging the channel matrices of the plurality of APs; and
    selecting the APs for which an average channel gain is greater than or equal to a first threshold value as candidate APs to be included in the candidate AP set.

5. The CSI feedback method of claim 4, wherein selecting the active AP set comprises selecting APs from the candidate AP set for which a multiple of an average channel gain and an instant channel gain is greater than or equal to a second threshold value.

6. The CSI feedback method of claim 1, wherein the downlink CSI includes average channel gain information of each active AP, relative channel difference information between active APs, and downlink CSI of each active AP.

7. The CSI feedback method of claim 6, wherein the downlink CSI of each active AP is expressed as information on a maximum singular vector of downlink channel matrix of each active AP, and wherein the information on the maximum singular vector is fed back to a transmitter using a weight vector closest to the maximum singular vector in a vector codebook.

8. The CSI feedback method of claim 6, wherein the relative channel difference information between the active APs includes a quantized complex variable having a size of 1 bit.

9. A Channel State Information (CSI) feedback apparatus for a wireless communication system including a distributed antenna system, the CSI feedback apparatus comprising:

a candidate Antenna Port (AP) set determination unit that determines a candidate AP set from among a plurality of APs;

an active AP set determination unit that selects an active AP set from the candidate AP set; and a transceiver that transmits information on the candidate AP set, information on the active AP set, and downlink CSI of active APs included in the active AP set.

10. The CSI feedback apparatus of claim 9, wherein the candidate AP set determination unit determines the candidate AP set from among the plurality of APs using slow fading.

11. The CSI feedback apparatus of claim 9, the active AP set determination unit selects the active AP set from the candidate AP set using fast fading.

12. The CSI feedback apparatus of claim 9, further comprising:

a downlink channel estimator that estimates downlink channel matrices using pilot channels transmitted by the plurality of APs; and a long-term channel gain estimator that calculates average channel gain using slow fading by averaging the channel matrices received from the plurality of APs, wherein the candidate AP set determination unit selects APs from among the plurality of APs for which an average channel gain is greater than or equal to a first threshold value as candidate APs to be included in the candidate AP set.

13. The CSI feedback apparatus of claim 12, wherein the AP set determination unit selects APs for which a multiple of an average channel gain and an instant channel gain is greater than or equal to a second threshold value as active APs to be included in the active AP set.

14. The CSI feedback apparatus of claim 9, wherein the downlink CSI comprises:

average channel gain information of each active AP;
relative channel difference information between active APs; and
downlink CSI of each active AP.

15. The CSI feedback apparatus of claim 14, wherein the downlink CSI of each active AP is expressed as information on a maximum singular vector of downlink channel matrix of each active AP, and wherein the information on the maximum singular vector is fed back to a transmitter using a weight vector closest to the maximum singular vector in a vector codebook.

16. The CSI feedback apparatus of claim 14, wherein the relative channel difference information between the active APs is a quantized complex variable having a size of 1 bit.

17. A Channel State Information (CSI) processing method of a transmitter in a wireless communication system including a distributed antenna system, the CSI processing method comprising:

receiving information on a candidate Antenna Port (AP) set including candidate APs selected from among a plurality of APs;

receiving information on an active AP set including active APs selected from the candidate AP set;

receiving downlink CSI on the active APs; and determining a maximum singular vector of downlink channel matrix for the plurality of APs using the downlink CSI on the active APs.

18. The CSI processing method of claim 17, wherein the candidate AP set is selected in consideration of slow fading, and wherein the active AP set is selected from the candidate AP set in consideration of fast fading.

19. A Channel State Information (CSI) processing apparatus of a transmitter in a wireless communication system including a distributed antenna system, the CSI processing apparatus comprising:

a feedback receiver that receives information on a candidate Antenna Port (AP) set including candidate APs selected from among a plurality of APs, information on an active AP set including active APs selected from the candidate AP set, and downlink CSI on the active APs; and an AP channel matrix recovery unit that determines a maximum singular vector of downlink channel matrix for the plurality of APs using the downlink CSI on the active APs.

20. The CSI processing apparatus of claim 19, wherein the candidate AP set is selected in consideration of slow fading, and wherein the active AP set is selected from the candidate AP set in consideration of fast fading.

* * * * *